(No Model.)　　　　　　　　　　　　　　　　　　　　　　2 Sheets—Sheet 1.
R. T. ONEY.
PEDO-ELECTRIC TROLLEY.
No. 551,996.　　　　　　　　　　Patented Dec. 24, 1895.
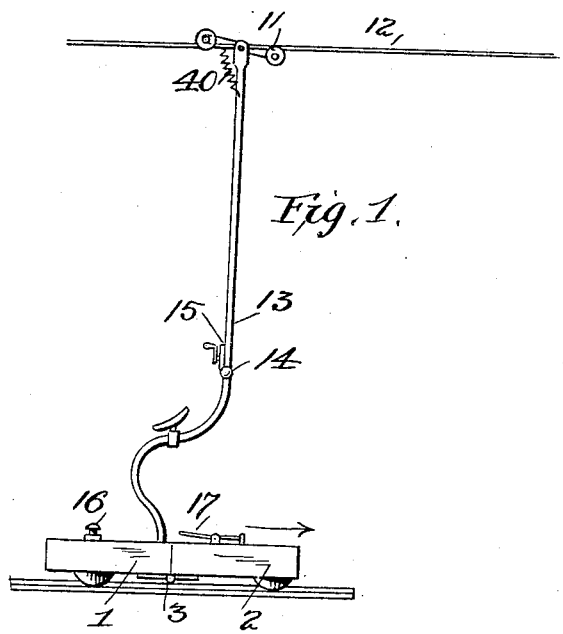
Fig. 1.
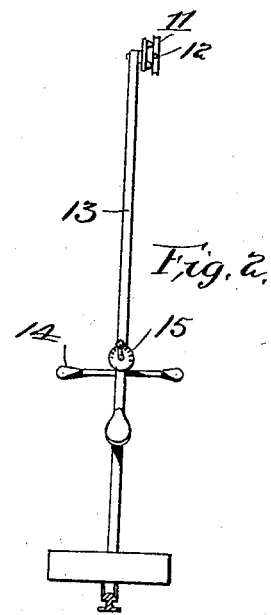
Fig. 2.
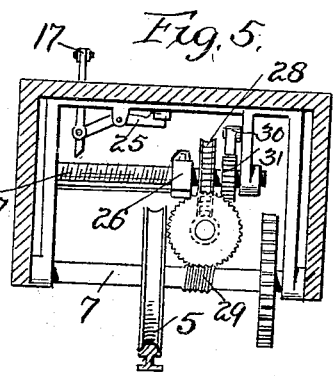
Fig. 5.
Fig. 6.
Attest
Inventor
Robert T. Oney
by Ellis Spear
Atty.

(No Model.) 2 Sheets—Sheet 2.
R. T. ONEY.
PEDO-ELECTRIC TROLLEY.
No. 551,996. Patented Dec. 24, 1895.
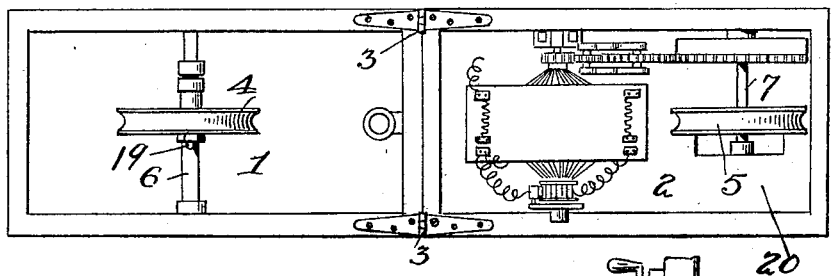
Fig. 3.
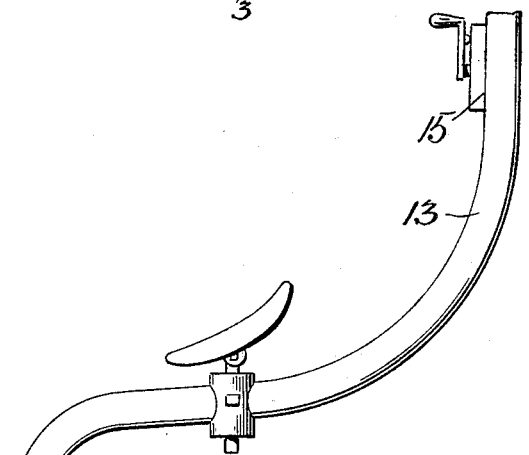
Fig. 4.
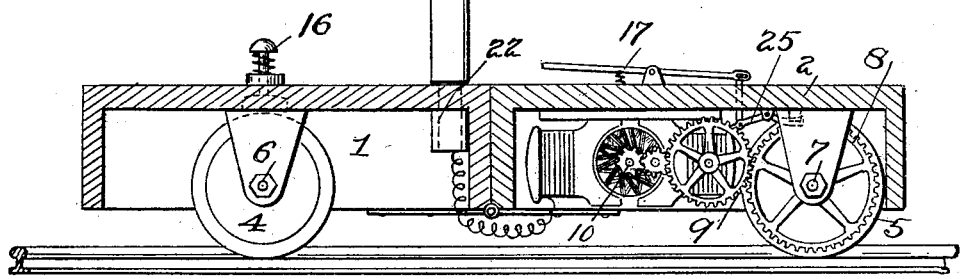
Attest
Wallace Donaldson
F. L. Middleton
Inventor
Robert T. Oney
by Ellis Spear
Atty.

UNITED STATES PATENT OFFICE.

ROBERT T. ONEY, OF CHARLESTON, WEST VIRGINIA.

PEDO-ELECTRIC TROLLEY.

SPECIFICATION forming part of Letters Patent No. 551,996, dated December 24, 1895.

Application filed March 27, 1895. Serial No. 543,357. (No model.)

*To all whom it may concern:*

Be it known that I, ROBERT T. ONEY, a citizen of the United States, residing at Charleston, in the county of Kanawha and State of West Virginia, have invented certain new and useful Improvements in a Pedo-Electric Trolley, of which the following is a specification, reference being had therein to the accompanying drawings.

It is the object of my invention to provide a pedo-electric trolley-carriage designed to run on a single rail and furnish individual means of transportation over a trolley-line.

It is my object to provide a carriage of small dimensions readily handled, of single construction and arranged to receive a single passenger who stands upon the carriage in rear of the trolley-pole and who through the usual rheostat and a suitable switch and brake has complete control of the machine, making it fast or slow to suit his requirements.

In the drawings, Figure 1 is a side view, and Fig. 2 a rear view, of the invention. Fig. 3 is a bottom plan view of the carriage. Fig. 4 is a central vertical sectional view with parts in elevation, and Figs. 5 and 6 are detail views.

The carriage consists of two parts 1 2, hinged together at 3 and each having a carrier-wheel, as 4 5, on the front and rear axles 6 7. The axle of the front carrier-wheel has a gear 8, to which motion is transmitted through a system of gears 9 from the armature-shaft 10 of the motor, to which the current is led in the ordinary way through suitable connection to the trolley 11 running upon the wire 12. The trolley-pole is shown at 13, and this carries an insulated seat or rest for the passenger and insulated handle-bars 14, near which is a rheostat 15. The two frame parts of the carriage are made of wood or other insulating material and the passenger stands with one foot on the forward frame-section and one on the rear, a brake 16 being adjacent to the rear foot and arranged to act on the rear carrier-wheel and a switch-lever 17 being arranged in convenient position to be operated by the forward foot of the passenger who has thus full control of the current and can regulate the speed of the carriage at will or stop the machine altogether. It will be understood that ordinary connections are made between the motor and the trolley and switch.

The operator, as before stated, stands upon the carriage and the seat is provided merely to form a rest for the operator.

Any suitable form of switch and brake may be used.

When the carriage is not in use and is to be removed from the rail, the two pivoted frame-sections are closed, forming a complete inclosing case, and for this purpose the carrier-wheels must be shifted out of line with each other, and this is done by removing the pin 19, Fig. 3, from the rear axle, shifting the rear wheel laterally so that it will occupy the space 20 when the case is closed and then replacing the pin to hold the wheel in shifted position. The trolley-pole is fitted removably in a socket 22.

I have provided means whereby the carriage will be rendered inoperative, if desired, after it has traveled a predetermined distance, so that it may be set at any time and will run only as far as set for and there become inoperative. The passenger by this means is prevented from riding farther than his ticket or fare calls for. This mechanism comprises a switch 25 of ordinary form, a nut 26 traveling on a screw 27 and adapted to operate the said switch after traveling the length of the screw and worm-gearing 28 29 between the screw-shaft and the axle of the carrying-wheel. A pawl-and-ratchet mechanism 30 31 prevents backward movement of the screw. When the nut reaches the end of the screw it may be removed and replaced at the desired point. For this purpose the nut is formed of hinged sections embracing the screw and held together by a suitable lock adapted to be opened only by an authorized person. The nut is held from rotation by a rod $26^\times$, fixed below the screw and engaging the nut, as shown in Fig. 5.

I do not wish to limit myself to the details of construction nor to the electrical connections. The rail may be used as the return branch of the circuit, and the switch is arranged between the motor and the rail. As shown in Fig. 5 the automatic switch has an extension through the carriage-frame to the outside, so that the current can be stopped at any moment by the operator moving the switch with his foot, as before described.

The trolley comprises two wheels on an arm pivoted to the upper end of the pole and under tension of a spring 40.

What I claim is—

1. An individual trolley carriage comprising a frame, the motor, the trolley and pole, the seat arranged in rear of the pole and the handle bars, and rheostat arranged on the said pole, substantially as described.

2. An individual trolley carriage comprising the platform, the carrier wheels beneath the same and arranged in line with each other, the motor connected with one wheel, the trolley pole extending up from the platform, the seat and rheostat carried thereby, the brake for the rear wheel, the operating rod extending up through the platform to be operated by one foot of the passenger, the electric switch and the operating means therefor arranged to be operated by the foot of the passenger, said means extending up through the platform of the car, substantially as described.

3. A trolley carriage comprising the two part hinged frame, the carrying wheels in line, the motor carried by one part, electrical connections thereto, one of said carrying wheels being arranged to be shifted out of line with the other to permit folding of the frame, substantially as described.

4. A trolley carriage comprising a motor, a frame, a switch controlling the current to the motor and means for operating the switch after the carriage has run a certain distance, substantially as described.

5. A trolley carriage comprising a motor, a switch controlling the current thereto, the traveling nut arranged to operate the switch, the screw for operating the nut, and the connections between the screw and the driving axle with means for preventing backward movement of the screw, substantially as described.

6. A trolley carriage comprising a motor, a frame, a switch controlling the current to the motor, and means for automatically operating the switch and locking the parts in inoperative position after the carriage has run a certain distance, substantially as described.

In testimony whereof I affix my signature in presence of two witnesses.

ROBERT T. ONEY.

Witnesses:
HENRY E. COOPER,
F. L. MIDDLETON.